United States Patent
Hars

(10) Patent No.: US 7,302,575 B2
(45) Date of Patent: Nov. 27, 2007

(54) APPARATUS FOR AND METHOD OF PREVENTING ILLICIT COPYING OF DIGITAL CONTENT

(75) Inventor: Laszlo Hars, Cortlandt Manor, NY (US)

(73) Assignee: Koninklijke Philips Electronics N.V., Einchoven (NL)

( * ) Notice: Subject to any disclaimer, the term of this patent is extended or adjusted under 35 U.S.C. 154(b) by 980 days.

(21) Appl. No.: 09/986,104

(22) Filed: Nov. 7, 2001

(65) Prior Publication Data

US 2003/0088774 A1 May 8, 2003

(51) Int. Cl.
*H04L 9/00* (2006.01)
*H04L 9/36* (2006.01)

(52) U.S. Cl. .................. 713/176; 382/100; 382/232; 382/276; 382/252; 713/179; 713/180; 713/181; 713/168; 705/75; 380/201

(58) Field of Classification Search ........... 713/193, 713/176; 213/113
See application file for complete search history.

(56) References Cited

U.S. PATENT DOCUMENTS

| 4,975,960 | A | | 12/1990 | Petajan |
| 5,428,598 | A | | 6/1995 | Veldhuis et al. |
| 5,513,260 | A | | 4/1996 | Ryan |
| 5,889,868 | A | * | 3/1999 | Moskowitz et al. ........ 713/176 |
| 5,915,027 | A | | 6/1999 | Cox et al. |
| 5,960,398 | A | | 9/1999 | Fuchigami et al. |
| 6,031,815 | A | | 2/2000 | Heemskerk |
| 6,209,092 | B1 | | 3/2001 | Linnartz |
| 6,233,347 | B1 | * | 5/2001 | Chen et al. .................. 382/100 |
| 6,724,911 | B1 | * | 4/2004 | Cox et al. .................... 382/100 |
| 6,771,797 | B2 | * | 8/2004 | Ahmed ........................ 382/100 |
| 7,024,018 | B2 | * | 4/2006 | Petrovic ...................... 382/100 |
| 7,100,050 | B1 | * | 8/2006 | Coppersmith et al. ....... 713/176 |

FOREIGN PATENT DOCUMENTS

| WO | 99/17288 | 4/1999 |
| WO | 99/60568 | 11/1999 |

OTHER PUBLICATIONS

Linnartz, J.P.M.G. "The 'ticket' concet for copy control based on embedded signalling". Philips Research, WY8, Holstlaan 4. Electrical and Cmputer Engiineering, University of California Berkeley. Feb. 24, 1998.*

Kalker: "System issues in digital image and video watermarking for copy protection" Multimedia Computing And Systems, 1999. IEEE International Conference On Florence, Italy, IEEE Comput. SOC, US, Jun. 7, 1999, pp. 562-567.

* cited by examiner

Primary Examiner—Syed A. Zia

(57) ABSTRACT

Further increases in the difficulty of importing to a secure domain digital content including watermarks which impose a degree of difficulty on illicit importing to the secure domain of the digital content is disclosed. Further increases in the degree of difficulty are necessary because the degree of difficulty associated with the watermarks is capable of being illicitly overcome by dividing the digital content being imported into segments that are so short that the watermarks cannot be reliably detected. In a recorder, recording is prevented by determining that adjacent activations of start and stop keys are such that the digital content has been so divided. In a playback unit, playback is prevented by determining that recorded sections are so short that the watermarks therein cannot be reliably detected.

20 Claims, 3 Drawing Sheets

APPARATUS FOR AND METHOD OF PREVENTING ILLICIT COPYING OF DIGITAL CONTENT

FIELD OF INVENTION

The present invention relates generally to increasing the difficulty of importing digital content including watermarks to a secure domain, which watermarks impose a degree of difficulty on illicitly copying the digital content, and more particularly to a method of and apparatus for increasing the importing difficulty by verifying copyright information in a long enough part of the digital content during the import to a secure domain.

BACKGROUND ART

The popularity of both the Internet and digital technologies (e.g., compact disks "CDs" and digital versatile disks "DVDs") has created tremendous problems for copyright owners of digital [media] content. The ability to reproduce, play and transmit digital content has become readily available to anyone with a personal computer and access to the Internet. This ability has led to widespread abuses to the rights of copyright owners who are unable to stop the illegal reproduction of their works.

One particular area where copyright ownership is particularly abused involves the music industry. The illicit pirating of digital music across the Internet is causing immeasurable damage to the music industry. Heretofore, most music content has been packaged and stored in an open, unsecured format that can be read and processed by any digital media player or recorder, i.e., content can be readily reproduced, stored and transmitted. To address this, the music industry has sought to create a secure domain to control the rampant pirating of music.

One solution the music industry is exploring involves establishing standards for secure playback and recording devices that process specially encoded content. Numerous secure devices and systems have been proposed. For instance, U.S. Pat. No. 5,513,260, issued on Apr. 30, 1996, entitled "Method and Apparatus For Copy Protection For Various Recording Media," describes a system in which an authorization signature is required before a protected CD can be played. PCT application WO 99/60568, published on Nov. 25, 1999, entitled "Copy Protection Using Broken Modulation Rules," also discloses various anti-pirating systems. Each of these references is hereby incorporated by reference.

In addition, a group referred to as SDMI (Secure Digital Music Initiative), made up of more than 180 companies and organizations representing information technology, consumer electronics, telecommunication, security technology, the worldwide recording industry, and Internet service providers, is attempting to develop standards and architectures for secure delivery of digital music in all forms. Information regarding SDMI can be found at their website at sdmi.org.

One of the challenges with implementing compliant systems, such as those sought under SDMI, is that various competing requirements must be met. For instance, under SDMI: (1) people must be allowed to make an unlimited number of personal copies of their CDs if in possession of the original CD; (2) SDMI-compliant players must be able to play music already in a library; (3) SDMI must provide the ability to prevent large numbers of illicit perfect digital copies of music; and (4) SDMI must prevent the illicit distribution on the Internet without any compensation to the creator or copyright holder. Thus, SDMI requires that a limited form of copying must be allowed, while at the same time widespread illicit copying must be prohibited.

Unfortunately, such competing requirements create opportunities for hackers and pirates to defeat the protection schemes of the systems. Accordingly, protection schemes that are difficult to defeat, but will meet the open requirements for initiatives such as SDMI, have and are being developed.

My co-pending, commonly assigned application Ser. No. 09/730,336, filed Dec. 5, 1999, incorporated herein by reference, discloses a method of and apparatus for imposing a degree of difficulty on illicitly copying digital media content. This application, as well as other prior art, discloses the use of watermarks for imposing a degree of difficulty on illicitly copying digital media content. The watermarks are in the form of coded digital signals interspersed during the process of putting the digital media content on a recording medium, such as a CD or DVD. Typically, the digital media content from the recording medium is partitioned into sections having fixed lengths from about 7 to 30 seconds dependent on the nature of the song recorded on the medium and the length of time required to decode the watermarks accurately. The watermarks are placed in the digital content with different coding and/or levels in different sections such that the effects of the watermarks are not perceptible to a typical listener of the digital content. The coding and/or levels of the watermarks are usually dispersed throughout a section and in some instances a watermark is repeated in a section. All sections or only some sections (e.g. only alternate sections) contain watermarks. The watermarks are designed to prevent illicit copying of the digital content because illicitly copied and modified digital content from the Internet or a CD or DVD onto a recording medium, such as a CD or a hard disk of a personal computer, does not include a correct and/or complete sequence of such watermarks. Playback devices responsive to the copied digital content are equipped with signal processors which prevent readout of at least a portion of the digital content which does not include the correct sequence of such watermarks. Typical modification of the content of illicit copying includes compression (e.g. MP3) or truncation (e.g. only a song is copied from a CD, not the entire medium).

Legally importing watermarked music into a protected (i.e. secure) domain (e.g. a copyrighted song having SDMI watermarked coding on a CD, DVD or the Internet) involves encrypting the content and attaching some copyright management (policy) information, describing the rights and capabilities of the user. A consortium, e.g. SDMI, controls what encryption is used in the protected domain, how playback is controlled, what the user can do with the music, the format of the policy file etc.

For example, music is typically delivered on audio CDs including a collection of tracks or songs. Illicit copying of such CDs is often limited to a small subset of the songs on a particular CD. In my previously mentioned application, such illicit copying is made considerably more difficult because a complete collection of tracks and watermarks must be present before a portion of an audio CD can be reproduced.

Watermark detection is a statistical process, that is not 100 percent accurate and requires substantial computational resources (digital signal processing). In a protected domain, there is no need for watermark detection, so devices having lower computational ability can play back the music. However, only legally purchased music should be allowed to be imported into the protected domain. If watermark protected music is illicitly manipulated (compressed or extracted from a protected domain), a hacker who cuts the watermark protected music into short pieces can import that music into the protected domain, piece by piece. This is because the watermark based copy protection does not work for pieces of music or sections that are shorter than a certain length (e.g. 7 seconds).

I realized that a possible way of illicitly importing watermarked digital content to a secure domain from a partial, illicit copy of an original CD or from the Internet is to import to the secure domain short sections of the digital content; the sections are so short (e.g. less than seven seconds) that none of the sections have enough information for reliable detection of the watermarks embedded in them. In such a situation, the prior art recording and/or playback devices would be incapable of determining that the digital signal it is processing contains digital content which is to be protected from illicit importing to a secure domain.

If such a short section or segment can be imported in one recording session an attacker, i.e., hacker, who desires to make an illicit copy might store the digital content one section at a time. The hacker restarts importing until he succeeds, for example, in the average once every ten times. Then the hacker resets the recording equipment and starts importing the next section of the digital content. By the time the hacker has imported the last section of the digital content, i.e., the portion of the digital content between the last watermark and the end of the digital content, he would have spent about 10 times as long as he would have spent if he had imported the original (unprotected) entire digital content. For many hackers, the time required to produce such a recording would be an acceptable price for illicitly copying the entire digital content, for example, to make a master CD of a musical composition for illicit sale. Upon completion, the hacker has individual sections which he would merge together to form the illicit copy of the digital content.

It is, accordingly, an object of the present invention to provide a new and improved method of and apparatus for preventing illicit importing to a secure domain of digital content protected by watermarks.

Another object of the invention is to provide a new and improved method of and apparatus for further increasing the difficulty of importing to a secure domain digital content including spaced watermarks which impose a degree of difficulty on illicitly copying the digital content.

An additional object of the invention is to provide a new and improved method of and apparatus for preventing illicit importing to a secure domain of digital content protected by spaced watermarks, despite attempts by hackers to defeat the protection provided by the spaced watermarks by removing all the watermarks.

SUMMARY OF THE INVENTION

In accordance with one aspect of the invention, there is provided a method of further increasing the difficulty of copying digital content including watermarks which impose a degree of difficulty on illicitly importing to a secure domain the digital content. The degree of difficulty associated with the watermarks is capable of being illicitly overcome by importing to a secure domain segments of the digital content that are so short the watermarks cannot be reliably detected. The method comprises preventing importing to a secure domain segments of the digital content having a length less than or equal to a length associated with the length of reliable watermark detection.

Another aspect of the invention relates to an apparatus arranged to be responsive to digital content including watermarks for imposing a degree of difficulty on illicitly importing to a secure domain the digital content. The apparatus is arranged for increasing the difficulty of illicitly importing to a secure domain the digital content. The difficulty associated with the watermarks is capable of being overcome by importing to a secure domain segments of the digital content which are so short (e.g. less than seven seconds) that the watermarks cannot be reliably detected. The apparatus comprises a detector for the digital content segments having a length less than a preset length. The preset length is so short that the watermarks cannot be reliably detected. A signal processor responsive to the detector and the digital content prevents importing to a secure domain of at least some of the digital content segments detected as having a length less than or equal to the preset length.

The illicit importing to a secure domain can be by recording segments of the content, in which case the invention is concerned with illicit recording of the digital content.

In some instances, some of the watermarks or a header of a track or song of the digital content indicate the digital content can be imported to a domain without copyright violation. In such cases, a determination is made if the digital content can be imported to a domain without violating copyrights of the owner of the digital content of the track or song. In response to the determination indicating the watermarks signal that the digital content can be imported to a domain, the prevent operation is overridden.

The above and still further objects, features and advantages of the present invention will become apparent upon consideration of the following detailed descriptions of one specific embodiment thereof, especially when taken in conjunction with the accompanying drawings.

DETAILED DESCRIPTION OF THE DRAWING

Figure 1:
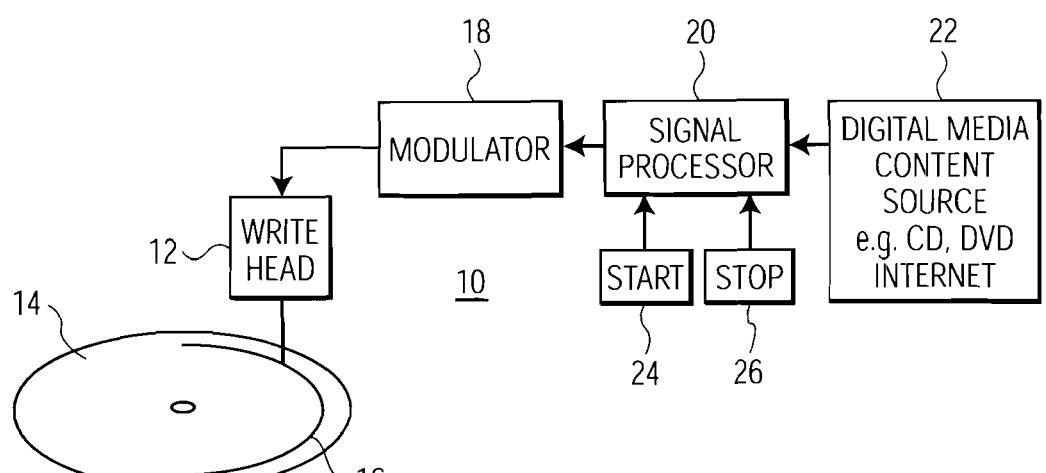
FIG. 1 is a schematic and block diagram of a recorder in accordance with a preferred embodiment of the invention.

Reference is now made to FIG. 1 of the drawing wherein recorder 10 is illustrated as including write head 12 for applying digital signals to compact disc 14 in a conventional manner. The digital signals are in the form of digital media content, typically songs or other musical compositions, written into tracks 16 on compact disc 14, such that each song is written into a separate track. Write head 12 responds to digital output signals of conventional modulator 18, in turn responsive to signal processor 20, driven by digital media content source 22. Digital media content source 22 is typically a compact disc (CD), a digital versatile disc (DVD), or a personal computer storing signals from an Internet site.

In most instances, the signal that digital media content source 22 derives includes watermarks, usually designed to prevent illicit copying of the digital media content of source 22. The watermarks are continuously embedded in periodic sectors of predetermined duration (usually between 7 and 30 seconds) of the digital media content of source 22. A header associated with the tracks or songs of source 22 includes digital signals for enabling proper detection of the watermarks, as disclosed, e.g., in my previously mentioned co-pending application. The watermark can also signal that there is no copyright protection for the digital media content, so copying thereof is legal.

Recorder 10 includes start and stop keys 24 and 26, which respectively supply start and stop signals to processor 20. To the casual user, keys 24 and 26 initiate and terminate operation of recorder 10 at the beginning and end of a recording cycle of source 22 onto CD 14. In actuality, processor 20 times the interval between adjacent activations of start and stop keys 24 and 26. In response to at least one of the intervals between adjacent activations of start and stop keys 24 and 26 being less than a predetermined time, e.g. 15 seconds, required for processor 22 to recognize a watermark, the processor prevents the CD from recording the song. Processor 22 also prevents the song from being recorded on CD 14 if one or more of the watermarks in a song are not completely intact or if the watermarks are intact and indicate the song is not to be illicitly copied. If the watermarks are intact and indicate the song can be copied legally, processor 20 drives modulator 18, which in turn activates write head 12, causing recording of the song on CD 14.

Figure 2:
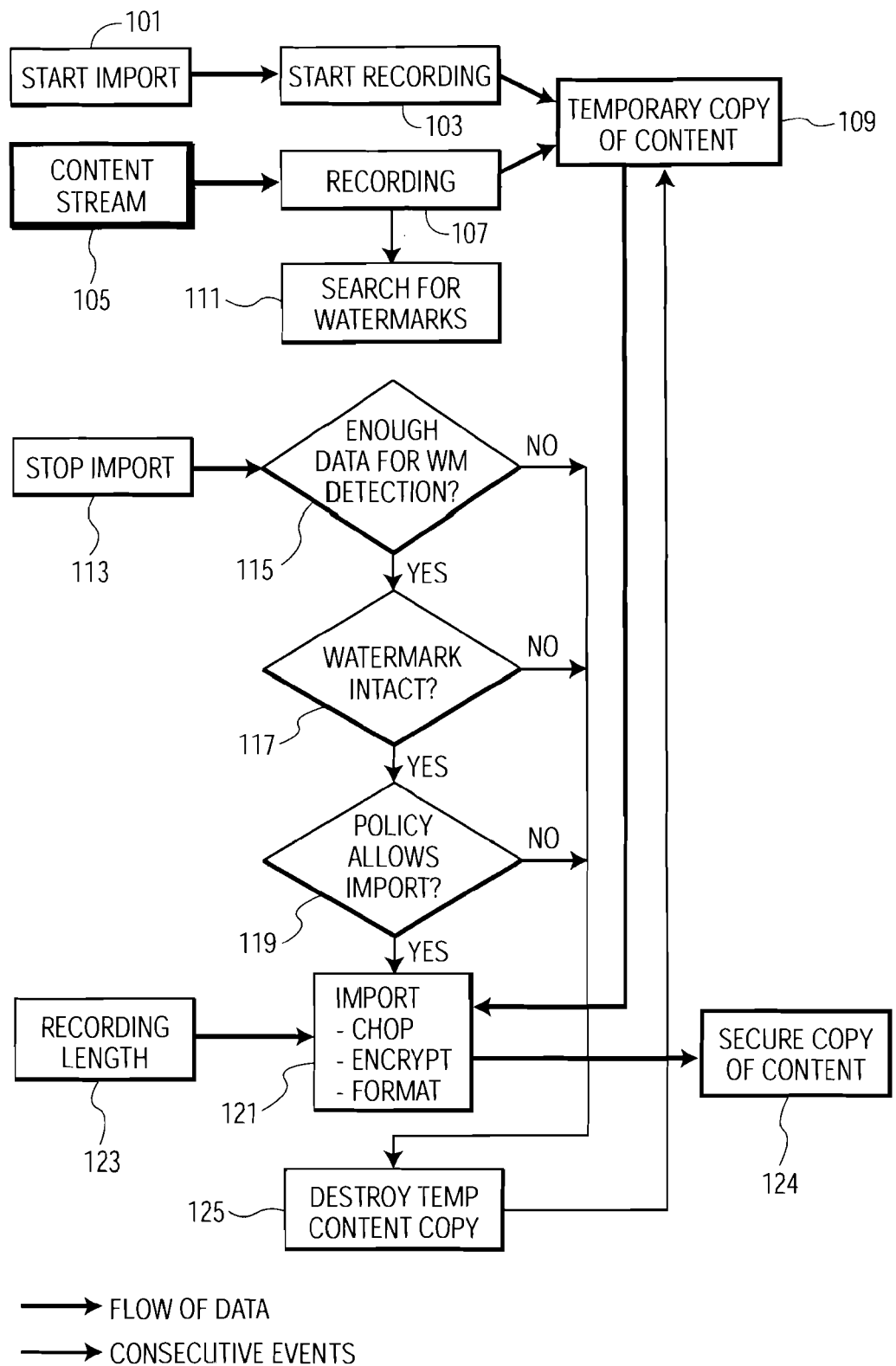
FIG. 2 is a flow diagram of operations performed by a signal processor included in the recorder of FIG. 1.

FIG. 2 is a flow diagram of operations performed by processor 20 of recorder 10 to prevent illegal and legal recording of data from source 22 onto CD 14. The process is initiated when a user of recorder 10, whether that user be a hacker or a user for authorized purposes, activates recorder start key 24, as indicated by operation 101. Processor 20 includes a clock which drives a register in the processor in response to start import command 101 being initiated. In response to operation 101 being performed, processor 20 is programmed to advance to operation 103, during which processor 20 issues a start recording command.

Processor 20 responds to the start recording command to supply a write enable signal to a temporary memory, such as a random access memory the processor includes. Processor 20, in response to the start recording command of operation 103 being performed, starts to read the digital media content stream of source 22 that is to be imported into recorder 10 (operation 105). The data from source 22 desired to be recorded or imported into CD 10 are processed by processor 20 during operation 107 so they can be supplied to the temporary memory. The data, after being processed during operation 107, are coupled into the enabled temporary memory, as indicated by operation 109. Simultaneously, conventional watermark detection algorithms in processor 20 search for and detect watermarks in the data being loaded into the temporary memory, as indicated by operation 111. The detected watermark data are also stored in the temporary memory.

Activation of stop key 26 is sensed during operation 113. In response to operation 113 sensing stop key 26 issuing a stop import command, the register in processor 20 responsive to the processor clock is disabled and the contents of the register are read during operation 115. During operation 115, processor 20 determines if there was sufficient time for operation 111 to detect watermarks between the occurrences of start import command 101 and stop import command 113. The typical time is about 15 seconds, but can be anywhere between 7 seconds and 30 seconds.

In response to operation 115 determining that the interval between start import command 101 and stop import command 113 was sufficient for enough data to be in content stream 105 for watermark detection during operation 111, the program of processor 20 advances to operation 117, during which a determination is made as to whether the watermarks of processor 20 read from source 22 (as detected during operation 111) in the content stream 105 were intact during the interval between adjacent activations of start and stop buttons (i.e., keys) 24 and 26.

If the watermark was detected as being intact, the program advances to operation 119, during which processor 20 determines from the watermark whether the data in content stream 105 that were imported during the interval between start import command 101 and stop import command 113 were such that the data can be legally copied onto CD 14. In response to operation 119 indicating that the data can be legally imported by recorder 10 into CD 14, the program advances to operation 121. Operation 121 is also responsive to a signal that processor 20 stores in one of its registers, which signal indicates the length of the song being recorded, as indicated in a header of source 22; the signal indicative of song length is read during operation 123. Operations 101-119 are performed for every periodic sector of source 22.

Upon completion of the recording length duration stored in the register, as indicated by operation 123, processor 20 processes all the sectors in the song during operation 121. To this end, during operation 121, processor 20 processes the content stream of all the sectors of the song stored in the temporary memory, as indicated by the flow of data from operation 109 to operation 121. During operation 121, the data from all the song sectors previously temporarily stored in the temporary memory are processed in the normal manner, by being chopped, encrypted and formatted. Upon completion of operation 121, processor 20 outputs to modulator 18 the data previously stored in the temporary memory. The modulator applies the data previously stored in the temporary memory to write head 12 and track 16 of CD ROM, as indicated by operation 124.

If, however, operation 115 determined that there were not enough data between start import command 101 and stop import command 113 for watermark detection in one or more sections of the song, or if operation 117 determined that the watermark was not intact, or if operation 119 indicated that the watermark data in one or more sections of the song could not be legally copied, the program advances to operation 125. In response to operation 125 being reached, the data stored in the temporary memory are erased, i.e., destroyed. Thereby, the efforts of the hacker who attempted to defeat the secure watermarking process by importing data for an interval so short that watermark detection could not occur, is foiled.

Figure 3:
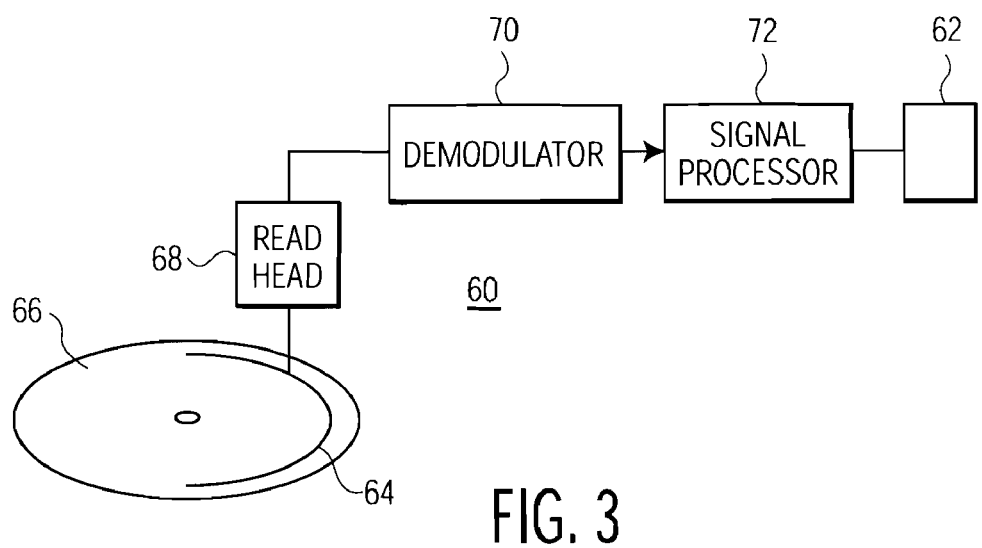
FIG. 3 is a schematic and block diagram of a playback unit in accordance with a preferred embodiment of the invention.

Reference is now made to FIG. 3 of the drawing, a schematic and block diagram of playback unit 60 having provisions for preventing meaningful reproduction by loudspeaker 62 of track 64 illicitly copied on CD 66 and for providing meaningful reproduction by the speaker of tracks lawfully copied on the CD. Playback unit 60 includes conventional read head 68 for deriving digital signals indicative of digital media content read from a track on CD 66. The digital output signals of read head 68 drive conventional demodulator 70, which in turn supplies digital signals indicative of the digital media content of the read track of CD 66 to signal processor 72. Signal processor 72 includes a digital to analog converter capable of deriving an analog music signal that drives loudspeaker 62.

Signal processor 72 is somewhat similar to signal processor 20, FIG. 1, because both processors prevent meaningful reproduction of illicitly copied songs of tracks. However, signal processor 72 differs from signal processor 20 because signal processor 72 prevents reproduction by speaker 62 of song sections that are (1) so short (less than a predetermined interval, e.g. less than 15 seconds) that watermarks cannot be detected, (2) contain watermarks that are not fully intact, or (3) contain a watermark indicating the section was illegally copied. Processor 72 is programmed to perform operations similar to the operations illustrated in FIG. 2, except that the program of processor 72 detects the duration of each sector, instead of the interval between adjacent activations of start and stop keys. Since this is the only significant difference between processors 20 and 72, there is no need to provide a flow diagram for the operations of processor 72.

The above and still further objects, features and advantages of the present invention will become apparent upon consideration of the following detailed description of a specific embodiment thereof, especially when taken in conjunction with the accompanying drawings. For example, the invention is not limited to digital media content, but is applicable to importing to a secure domain any digital content having watermarks for preventing illicit copying. The content in the secure domain can be stored not only on CD's but in any magnetic, optic or semiconductor memory or storage medium. The above references to CD 14 and CD 66 are merely illustrative examples.

I claim:

1. A method of further increasing the difficulty of importing to a secure domain digital content including watermarks which impose a degree of difficulty on illicitly importing to the secure domain the digital content, the degree of difficulty associated with the watermarks being capable of being illicitly overcome by importing to the secure domain segments of the digital content which are so short that the watermarks cannot be reliably detected, the method comprising preventing importing to the secure domain of sections of the digital content having a length less than or equal to a length associated with the length of reliable watermark detection.

2. The method of claim 1 wherein
the illicit importing to the secure domain comprises recording the segments without recording the watermarks and
the method is performed while there is illicit recording of the digital content.

3. The method of claim 1 wherein
the illicit importing to the secure domain comprises recording the segments without playing back the watermarks and
the method is performed while there is illicit playback of the digital content.

4. The method of claim 1 wherein
data associated with the digital content indicate the digital content can be copied,
the method further comprising
determining whether the digital content is not to be illicitly imported to the secure domain or can be legally imported to a domain, and
overriding the preventing step in response to the determining step determining that the digital content can be legally imported.

5. The method of claim 4 further including
detecting the presence of a distorted watermark, and
performing the preventing step in response to the distorted watermark being detected.

6. The method of claim 1 further including
detecting the presence of a distorted watermark, and
performing the preventing step in response to the distorted watermark being detected.

7. Apparatus arranged to be responsive to digital content including watermarks for imposing a degree of difficulty on illicitly importing to a secure domain the content, the apparatus being arranged for increasing the difficulty of illicitly importing to the secure domain the digital content, the difficulty associated with the watermarks being capable of being overcome by importing to the secure domain segments of the digital content which are so short that the watermarks cannot be reliably detected, the apparatus comprising a detector for segments of the digital content having a length equal to or less than a preset length,
the preset length being so short that the watermarks cannot be reliably detected, and
a signal processor responsive to the detector and the digital content for preventing importing to the secure domain at least some of the digital content segment being detected as having a length less than or equal to the preset length.

8. The apparatus of claim 7 wherein
the signal processor is arranged for preventing copying of the digital content segments detected as having a length less than the preset length.

9. The apparatus of claim 7 wherein
the signal processor is arranged for preventing readout of all the digital media content accompanying a segment detected as having a length less than the preset length.

10. The readout apparatus of claim 7 wherein the apparatus comprises
a recorder for the digital content.

11. The apparatus of claim 7 wherein the apparatus comprises
a playback unit for the digital content.

12. The apparatus of claim 7 wherein
data associated with the digital content indicate the digital content can be legally imported to a domain,
the detector being arranged for determining whether the digital content is not to be illicitly imported to the secure domain or can be legally imported to a domain,
the signal processor being arranged to enable importing to a domain all the digital content in response to the detector determining that the digital content can be imported.

13. The apparatus of claim 12 wherein
the detector is arranged for detecting the presence of distorted watermarks,
the signal processor being arranged to prevent importing to the secure domain in response to the detector detecting the presence of a distorted watermark.

14. The apparatus of claim 7 wherein
the detector is arranged for detecting the presence of distorted watermarks,
the signal processor being arranged to prevent importing to the secure domain in response to the detector detecting the presence of a distorted watermark.

15. The apparatus of claim 7 in combination with a recorder of digital content,
the signal processor being arranged for supplying the digital content to the recorder unless the detector detects that the digital content has been illicitly importing to a secure domain.

16. The apparatus of claim 7 in combination with a playback unit of digital content,
the signal processor being arranged for supplying the digital content to the playback unit unless the detector detects that the digital content is illicitly copied.

17. A method comprising:
receiving a segment of digital media content at a secure domain;
determining whether the length of the segment is sufficient to enable detection of a watermark if present in the segment; and
controlling importation of the segment into the secure domain in response to the segment length determination.

18. The method of claim 17, wherein
controlling importation of the segment into the secure domain includes
preventing importation of the segment into the secure domain if the length of the segment is not sufficient to enable detection of a watermark if present in the segment.

19. The method of claim 18, wherein
controlling importation of the segment into the secure domain includes
detecting any watermark in the segment if the length of the segment is sufficient to enable detection of a watermark if present in the segment.

20. The method of claim 19, wherein
controlling importation of the segment into the secure domain includes
complying with a content usage policy associated with any watermark detected in the segment.

* * * * *